No. 792,124. PATENTED JUNE 13, 1905.
W. H. EVANS.
FOUNTAIN COMB.
APPLICATION FILED NOV. 21, 1904.
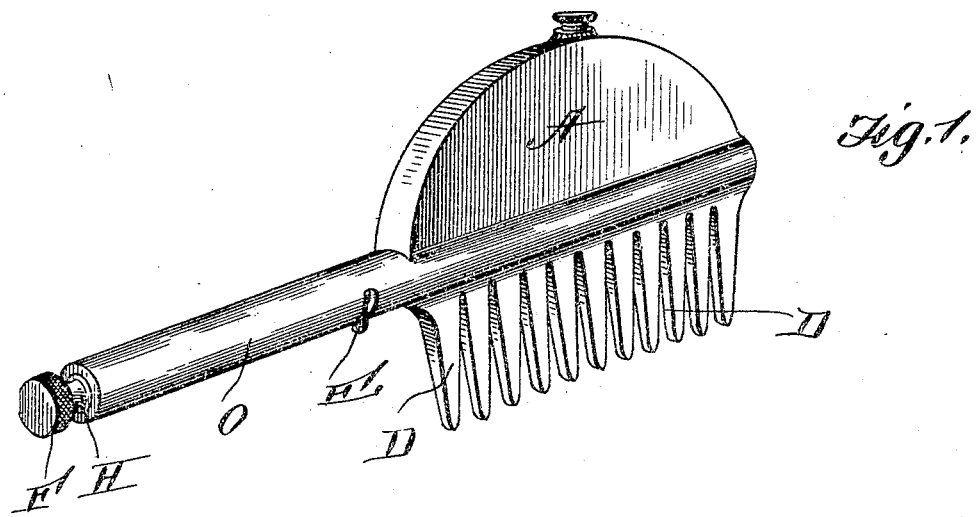
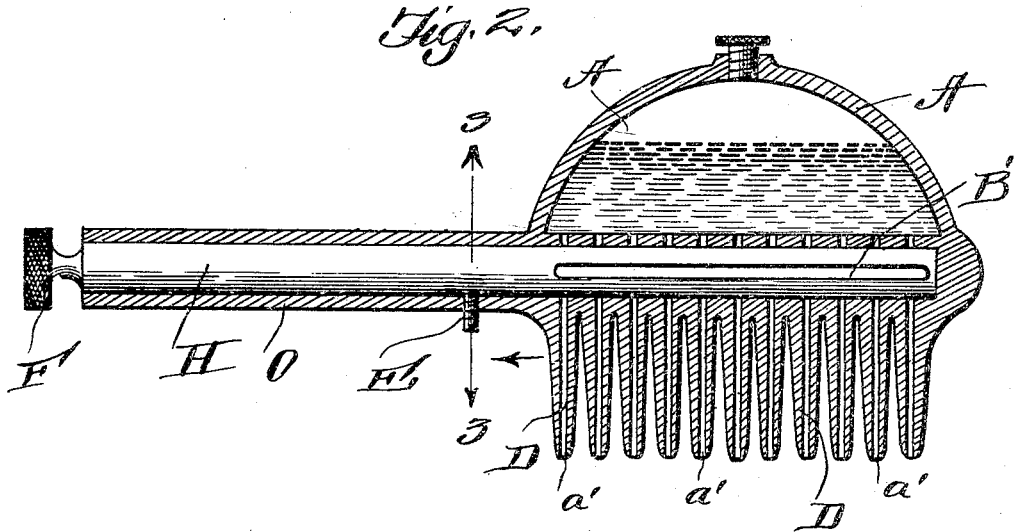
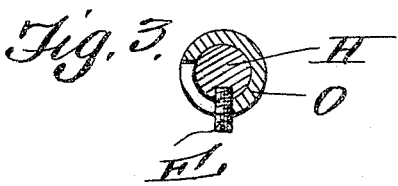
Witnesses
R. A. Boswell.
A. L. Hough.
Inventor
William Henry Evans
By Franklin N. Hough
Attorney No. 792,124. Patented June 13, 1905.

UNITED STATES PATENT OFFICE.

WILLIAM HENRY EVANS, OF MONTICELLO, ILLINOIS.

FOUNTAIN-COMB.

SPECIFICATION forming part of Letters Patent No. 792,124, dated June 13, 1905.

Application filed November 21, 1904. Serial No. 233,754.

*To all whom it may concern:*

Be it known that I, WILLIAM HENRY EVANS, a citizen of the Dominion of Canada, residing at Monticello, in the county of Piatt, in the State of Illinois, have invented a new, original, and useful device which I call the "Magic Massage-Comb," of which the following is a specification.

This invention relates to new and useful improvements in fountain-combs; and the object of the invention is to produce a simple and efficient device of this character in which a liquid may be supplied to and fed from the teeth of a comb while in use; and it consists in the provision of a font or receptacle for the liquid and in the provision of a rotatable rod serving as a valve and which is provided with an elongated slot, which rod may be turned to allow the liquid to flow into the teeth from the font or prevent the liquid flowing, as may be desired.

The invention consists, further, in various details of construction and arrangements of parts, as will be hereinafter fully described and then specifically defined in the appended claim.

My invention is illustrated in the accompanying drawings, in which—

Figure 1 is a perspective view of my invention. Fig. 2 is a central longitudinal sectional view through the device, and Fig. 3 is a cross-sectional view on line 3 3 of Fig. 2.

Reference now being had to the details of the drawings by letter, A designates the font or receptacle for liquid, and O designates a tubular projection which communicates with the font.

H designates a rod which is of a diameter equal to the diameter of the tubular extension O, in which it telescopes, and is provided with an elongated slot B', which is adapted, when the rod is turned in the right position, to open communication between the font and the hollow teeth D, whereby the liquid may flow from the slots a'. Said rod H has a handle F at one end, whereby the rod may be conveniently rotated, and a pin E, which is adapted to limit its throw in one direction or the other to allow a liquid to flow to the teeth of the comb or cut off or prevent the flow of the liquid, as may be desired.

Having thus fully described my invention, what I claim as new, and desire to secure by Letters Patent, is—

A fountain-comb comprising a receptacle for liquid with a series of hollow teeth with slotted ends, a tubular projection in said receptacle adapted to communicate with said receptacle and hollow teeth, a rod mounted within said tubular projection and having an elongated slot therein adapted to open and close communication between the receptacle and hollow teeth, a pin carried by said rod and adapted to limit its rotary movement, and a handle secured to the end of said rod, as set forth.

In testimony whereof I have signed my name to this specification in the presence of two subscribing witnesses.

WILLIAM HENRY EVANS.

Witnesses:
   G. R. DAWSON,
   BENJAMIN F. KAGEY.